United States Patent [19]

Hallar

[11] 4,085,546
[45] Apr. 25, 1978

[54] LIQUID SUPPLY SYSTEM FOR GARDENS

[76] Inventor: James O. Hallar, 126 S. Courtland, Topeka, Kans. 66606

[21] Appl. No.: 695,599

[22] Filed: Jun. 14, 1976

[51] Int. Cl.² .......................................... A01G 31/00
[52] U.S. Cl. .................................................... 47/59
[58] Field of Search .......................... 47/48.5, 59–65, 47/79–81

[56] References Cited

U.S. PATENT DOCUMENTS

| | | | |
|---|---|---|---|
| 1,133,182 | 3/1915 | Ray | 47/48.5 |
| 1,231,975 | 7/1917 | Weitzel | 47/79 |
| 2,183,970 | 12/1939 | Meissl | 47/80 |
| 2,198,150 | 4/1940 | Barnhart | 47/62 |
| 2,249,197 | 7/1941 | Brundin | 47/64 |
| 2,336,755 | 12/1943 | Sejarto | 47/62 |
| 2,486,512 | 11/1949 | Armstrong | 47/62 |
| 2,592,976 | 4/1952 | Thomas | 47/62 |
| 2,983,076 | 5/1961 | Merrill | 47/62 |
| 3,534,498 | 10/1970 | Herrli | 47/81 |
| 3,758,987 | 9/1973 | Crane | 47/80 |

Primary Examiner—Edgar S. Burr
Assistant Examiner—James R. Feyrer
Attorney, Agent, or Firm—Lowe, Kokjer, Kircher, Wharton & Bowman

[57] ABSTRACT

Hydroponic aggregate is contained in a garden box in which plants are grown. Nutrient solution is supplied through a liquid tube from an airtight tank to an enclosed housing disposed beneath the aggregate on the floor of the box. Outlets are provided from the housing for discharging the solution to the aggregate. Air is supplied to the housing through an aeration tube. Flow of solution continues until a pool is built up on the box to a depth sufficient to submerge the lower end of the liquid tube. Air is then unable to flow up the liquid tube to displace the liquid within the tank and the liquid flow is thus stopped. A drain hose for draining off excessive liquid that may build up in the box serves alternatively as a liquid level gauge.

11 Claims, 6 Drawing Figures

U.S. Patent  April 25, 1978  Sheet 1 of 2  4,085,546
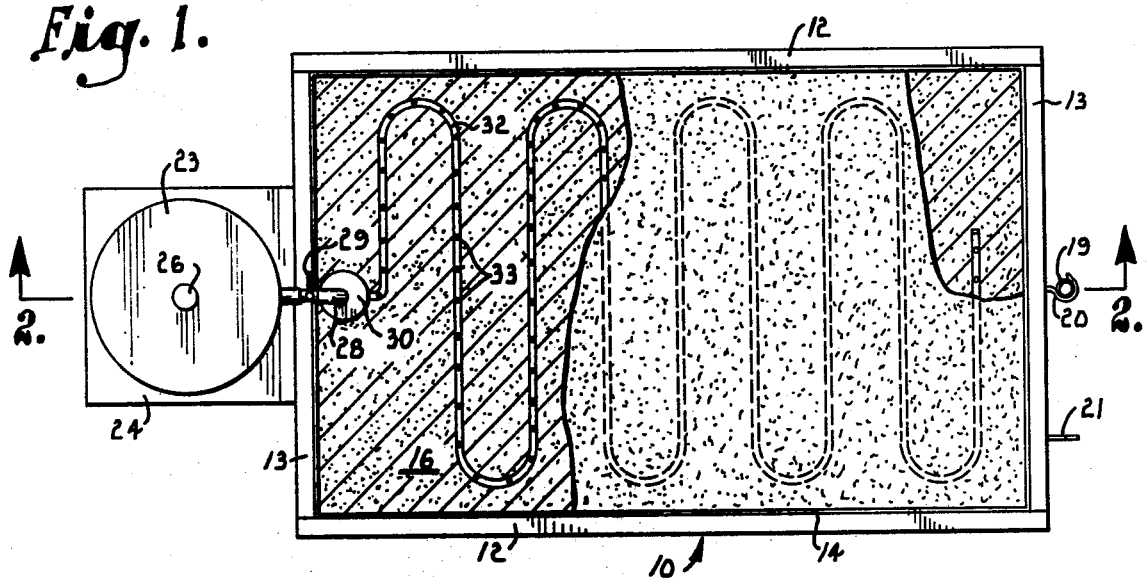
Fig. 1.
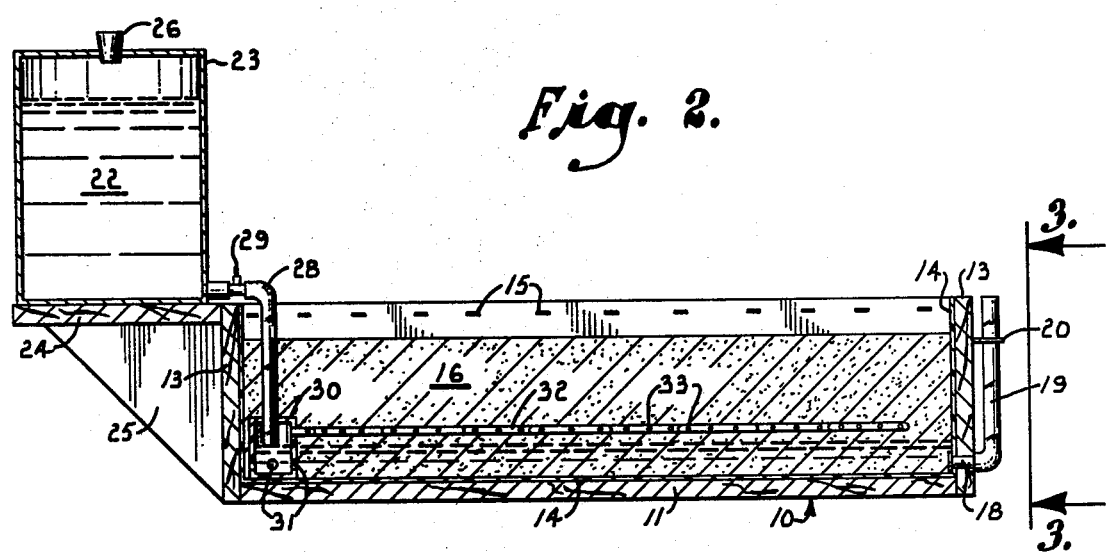
Fig. 2.
Fig. 3.
Fig. 4.

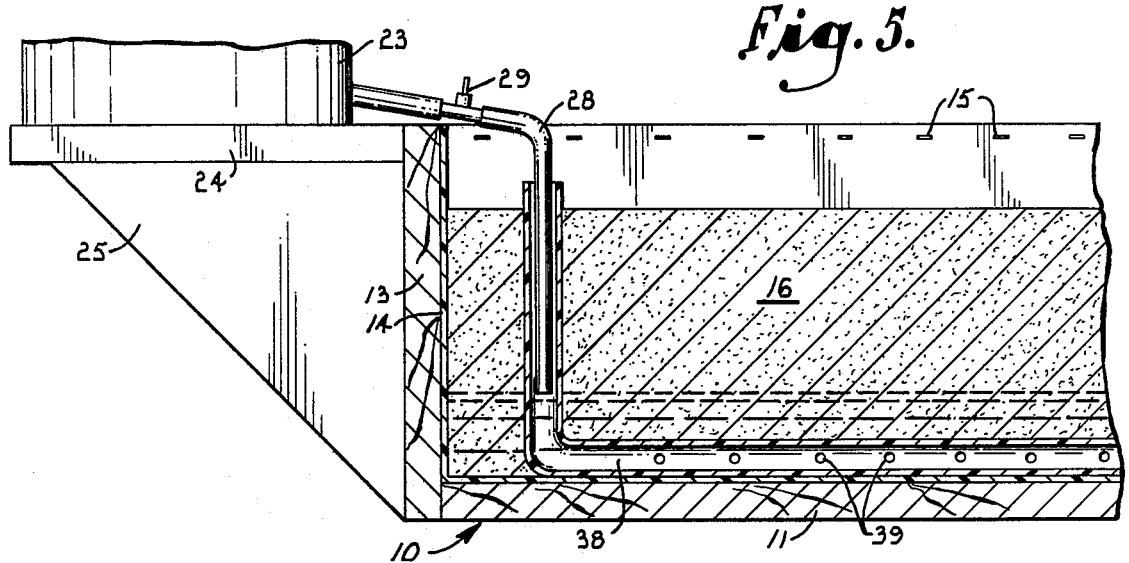
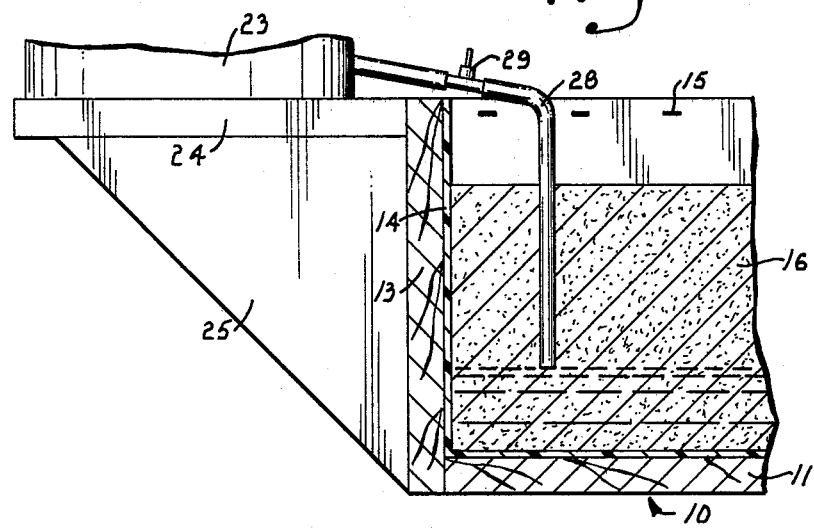

LIQUID SUPPLY SYSTEM FOR GARDENS

BACKGROUND AND SUMMARY OF THE INVENTION

This invention relates in general to gardening equipment and deals more specifically with apparatus used to supply liquid to hydroponic aggregate or to an ordinary garden box.

In hydroponics it is necessary to supply water, minerals, and nutrients to the special aggregate in which the plants are grown. This is typically done by applying to the aggregate a formula or chemical solution of water plus minerals, nutrients, and the like. In most small home grown hydroponic gardens, the nutrient solution is simply poured manually into the garden bed. This is not altogether desirable because the solution is not always supplied in sufficient quantity and at the time when it is particularly needed by the plants. The yield and condition of the plants suffers accordingly. Many of the same problems are involved with the watering of ordinary soil gardens and the application of liquid fertilizer thereto.

There have been automatic watering systems developed for large commercial gardens which apply water, liquid fertilizer, or nutrient solution more closely in accordance with the needs of the plants. This type of equipment requires pumps, valves, timers, and similar devices which make it so expensive as to be impractical for small gardens and often even for large scale gardening operations. There have been additional efforts made to devise automatic waterers that are more practical for use in small gardens. For the most part, however, this equipment has not been successful because of the costs involved in the specially constructed garden boxes, complex tubing arrangements, and other specialized components that are required.

Another problem with existing equipment of this type has been that the tubes frequently become clogged by the aggregate. In addition, provision is usually not made for the handling of excessive water, and outdoor gardening is thus virtually prohibited because of the exposure to heavy rainfall. Existing watering devices are further deficient in that they usually do not provide adequate aeration of the aggregate. Even in those that do provide for aeration, substantial portions of the aeration tubes are at times located below the liquid level so that they are susceptible to being stopped up by the solution. An additional problem has been to provide a convenient means for adjusting the amount of liquid delivered to the garden in order to accommodate varying absorption rates of different soils or aggregates. Typically, no such adjustment means is provided, or if it is, the garden bed must be torn up to effect the adjustment.

In view of the foregoing problems associated with existing equipment of this nature, a need remains for an economical system for supplying liquid in the proper quantity and at the proper time to the soil or aggregate contained in a garden box. It is the primary goal of the present invention to meet that need by providing apparatus that serves to supply nutrient solution to hydroponic aggregate or to supply water or liquid fertilizer to a garden box containing ordinary soil.

More specifically, it is an object of the invention to provide improved gardening apparatus which acts automatically to supply the soil or aggregate in a garden box with liquid in adequate quantity. It is significant in this respect that the aggregate or soil is continually maintained in a saturated condition so as never to be lacking for nutrients or water.

Another object of the invention is to provide apparatus of the character described which feeds the liquid by means of gravity so as to avoid any need for pumps or similar equipment and the associated power requirements.

Still another object of the invention is to provide apparatus of the character described which may be used with either indoor or outdoor gardens. The provision of a drain in the garden box is important in this respect because it assures that excessive water will be rapidly drained off even after heavy rainfall.

In conjunction with the preceding object, yet another significant feature of the invention is the inclusion of a drain tube which serves alternatively as a gauge that indicates the liquid level in the box.

A further object of the invention is to provide apparatus of the character described which includes simple and reliable means for adjusting the level of the liquid that builds up in the garden box so as to accommodate the different soils or aggregates.

An additional object of the invention is to provide apparatus of the character described that includes reliable means for adequately aerating the aggregate or soil at all times. It is significant in this regard that the aeration tube is entirely above the liquid level so that the air flow is not interfered with by the liquid.

A still further object of the invention is to provide apparatus of the character described that requires only a single garden box and a minimum amount of tubing.

Still another object of the invention is to provide apparatus of the character described which is equally useful with small, home grown gardens and with large scale commercial gardens.

Yet another object of the invention is to provide apparatus of the character described in which a substantially enclosed housing member is included so that aggregate or soil particles are not able to enter the housing and possibly clog the tubes.

Other and further objects of the invention together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a top plan view of a hydroponic garden box and a system for supplying nutrient solution thereto in accordance with the present invention, with portions of the aggregate contained in the box broken away for illustrative purposes;

FIG. 2 is an elevational view in cross section taken generally along line 2—2 of FIG. 1 in the direction of the arrows;

FIG. 3 is a fragmentary end elevational view taken generally along line 3—3 of FIG. 2 in the direction of the arrows, with a portion of the box broken away for illustrative purposes and the broken lines indicating the drain hose positioned to drain off excessive liquid from the box;

FIG. 4 is a fragmentary side elevational view on an enlarged scale and partially in cross section illustrating a second embodiment of the invention;

FIG. 5 is a fragmentary side elevational view in cross section similar to FIG. 4 but illustrating a third embodiment of the invention; and FIG. 6 is a fragmentary side elevational view in cross section similar to FIGS. 4 and 5, but illustrating a fourth embodiment of the invention.

Referring to the drawings in detail, the present invention provides apparatus which delivers nutrient solution that is required in hydroponic gardening. A hydroponic garden as shown in the drawings includes a rectangular bed or box 10 that comprises a flat bottom 11, side walls 12, and end walls 13, all of which are lined on their inside surfaces with a thin flexible liner 14. The liner 14 is stapled to box 10 as indicated at 15 and is preferably a plastic material or any other substance that is compatible with the plants and with the aggregate substance 16 in which the plants are grown.

A drain opening is formed through one end wall 13 of the box and through the adjacent portion of liner 14. A hollow cylindrical fitting 18 (FIG. 2) is sealed at one end to liner 14 in communication with the drain opening and is fit through the end wall 13. A transparent drain hose 19 is fit over and sealed to the opposite or outer end of fitting 18. A hook 20 extends outwardly from end wall 13 at a location above the connection of hose 19 to fitting 18. Hook 20 is adapted to receive the drain hose 19 near its upper end in order to hold the hose in a generally vertical orientation in which it serves as a liquid level gauge, as will be explained in more detail. A second hook 21 extends outwardly from end wall 13 at a location well below and to one side of hook 20. Hook 21 is able to receive and retain hose 19 in the slightly inclined position shown in broken lines in FIG. 3. In this position hose 19 serves to drain off excess liquid that may build up in box 10.

The hydroponic aggregate 16 is an inert substance which may comprise a mixture of sand and gravel, or perlite, zonite or the like. To obtain a high crop yield, the aggregate is supplied with nutrients, minerals, and other chemicals which enhance the quality of the plants. This is normally accomplished by applying to the aggregate an aqueous solution which contains the minerals, nutrients, and other desirable chemicals. The present invention is concerned with the application of such a solution to the garden box.

The plant formula or solution 22 is contained in an airtight tank 23 which is supported at an elevation above the top of box 10 on a horizontal platform 24 which extends outwardly from the top of the end wall 13 opposite the drain. A gusset 25 strengthens the mounting of platform 24. Tank 23 is preferably transparent so that the liquid level may be determined visually. A fill opening formed in the top of tank 23 for replenishing the solution is tightly closed by a cork 26 which forms a leak-proof seal to make the tank airtight. While cork 26 is preferred as the seal for tank 23, it may instead be sealed by an airtight screw top (not shown) or another type of airtight seal member.

A liquid delivery tube 28 connects with an outlet opening formed in tank 23 near the bottom thereof. Tube 28 extends generally horizontally although downwardly somewhat away from the tank and is bent downwardly into box 10. The generally horizontal portion of tube 28 is equipped with a valve 29 which opens and closes the tube to liquid flow. Tube 28 leads into a housing 30 within which the lower end of the liquid tube is disposed. Tube 28 and housing 30 connect in an airtight seal.

Housing 30 is normally placed on the floor 11 of the box and is completely covered by the aggregate 16, although the housing may be elevated above the floor in some situations. The housing is generally cylindrical and has a hollow interior in which the lower end of tube 28 is located. Housing 30 is preferably a completely enclosed structure so that the aggregate cannot enter it, although it may be open at the bottom since its bottom normally rests on the solid floor 11 and is thus closed off from the aggregate. Housing 30 is provided near its lower end with one or more outlet openings 31 (FIG. 2) which are below the lower end of tube 28 and which serve to discharge the solution to the aggregate.

An elongate aeration tube 32 connects in an airtight seal to housing 30 in communication with the interior thereof at a location well above the lower end of tube 28. The aeration tube 32 serves to supply air to the interior of housing 30 and also to aerate aggregate 16. Tube 32 leads away from housing 30 and is strung out beneath the surface of aggregate 16 in the curved, twisted fashion shown in FIG. 1. It is important to note that the entirety of tube 32 is located at a level well above the lower end of tube 28. A plurality of aeration apertures 33 are formed in tube 32 along the entire length thereof. The end of tube 32 remote from housing 30 is a closed end which is beneath the aggregate. Aeration of the aggregate occurs substantially continuously due to the tendency in tank 23 and thus to flow downwardly through the aggregate as it attempts to enter apertures 33.

In use, tank 23 is filled with solution to the desired level through the fill opening in the top of the tank with valve 29 closed. After filling, cork 26 is tightly inserted in the fill opening to make the tank airtight. Valve 29 is opened when it is desired to supply aggregate 16 with the nutrient solution. The solution then flows by gravity out of tank 23 through tube 28 into housing 30, and then out of the housing through the discharge openings 31 thereof. Floor 11 of the box is disposed in a substantially level position so that the liquid flowing out of the housing reaches all areas of the floor.

As the solution flows out of tank 23 into the garden box 10, it is displaced by air which is able to enter the lower end of tube 28 and pass upwardly therethrough into the tank. The solution continues to flow and to build up in a pool on floor 11 until the pool reaches a depth sufficient to submerge the lower end of tube 28, at which time the air can no longer enter the tube. Since the air no longer has access to tank 23 in order to displace the liquid, the liquid flow out of the tank stops, and the level of the pool in box 10 is therefore maintained at the height of the lower end of tube 28.

As the solution evaporates and is used by the plants growing in the aggregate, the aggregate becomes unsaturated and begins to absorb additional liquid from the pool in the box. The liquid level in the box therefore drops below the lower end of tube 28, and the air within housing 30 again has access to enter the lower end of tube 28. The air is able to bubble upwardly through tube 28 into tank 23 for displacement of the solution which flows out of the tank. The liquid flow continues until the pool on floor 11 reaches the level of the lower end of tube 28, whereupon the flow stops since there is again a lack of air access into tank 23.

In this manner, a pool having a preselected depth (the distance of the lower end of tube 28 above floor 11) is continuously maintained in the box, with solution automatically flowing from tank 23 when the depth of the pool decreases and automatically stopping when the desired depth is reached. Thus the aggregate is always maintained in a saturated condition and there are no periodic shortages or excesses of liquid. The depth of the pool may be varied as desired simply by varying the distance of the lower end of tube 28 above floor 11.

Since the entirety of aeration tube 32 is located well above the liquid level at all times, the aeration apertures 33 are never submerged or closed off to air flow by the solution, even if tube 32 is oriented at a considerable angle from horizontal. Also, apertures 33 cannot become clogged with wet aggregates even if floor 11 is disposed at a considerable angle from horizontal as it often is, particularly in larger gardens. Aeration of the aggregate in all areas of box 10 is therefore assured, as is an adequate supply of air through tube 32 to the interior of housing 30 for proper liquid flow. In addition, the aggregate is unable to enter housing 30 to possibly clog tubes 28 and 32 because the outlet apertures 31 provide the only access to the housing and may be made small enough to prevent the entry of aggregate particles to any significant extent.

Hose 19 may be inserted in hook 20 and retained in the vertical position shown in solid lines in FIG. 3. The liquid flows into the hose and rises to the same level as that in box 10. As previously suggested, hose 19 is transparent so that it serves as a liquid level gauge which visually indicates whether the lquid is above or below the normal level. Thus, if cork 26 is loose and liquid from tank 23 flows into box 10 in excessive amount, or if tank 23 runs dry and the liquid level in the box drops too low, hose 19 will so indicate to enable corrective steps to be taken.

Alternatively, hose 19 may be swung to the side and inserted in the other hook 21 in the slightly inclined position shown in broken lines in FIG. 3. Hook 21 is elevated such that it positions hose 19 with its upper end a slight distance above the liquid level that is normally maintained in box 10 (the level of the lower end of tube 28). Accordingly, hose 19 normally does not drain off any liquid from box 10. However, if the liquid in the box rises above its normal level (as may occur when the box is outside during a heavy rainfall or if cork 26 is loose), the liquid is drained out of the box through hose 19 until it is reduced to a level below the highest point of the hose. This assures that excess liquid that may get into the garden box will be automatically drained off.

FIG. 4 illustrates an alternative embodiment of the invention wherein the aeration tube 32 is eliminated and replaced by a vertical air tube 35 which is of larger diameter than tube 28. Tube 35 enters the top of the housing 30 in a leakproof seal therewith and is sleeved around the vertical portion of tube 28. The lower end of tube 35 is located within the interior of housing 30 at a level above the lower end of the liquid tube 28. Tube 35 extends vertically above the housing and projects above the aggregate 16 at its top end which is open for receiving air. The annular space between tubes 28 and 35 provide air access to the interior of housing 30. Tube 28 may be moved up or down axially within tube 35 in order to adjust the elevation of its lower end and thus vary the level of the liquid pool that builds up in the garden box. In this manner, the different absorption rates of different aggregates and different soils are accommodated.

A single outlet opening near the bottom of housing 30 connects with an elongate flexible distribution tube 36. Tube 36 is strung out along substantially the entire area of floor 11 in a twisted fashion similar to the arrangement of tube 32 shown in FIG. 1. A plurality of outlet apertures 37 are formed in tube 36 along its entire length for discharging the solution to the aggregate.

The embodiment shown in FIG. 4 operates in substantially the same manner as previously described in connection with FIGS. 1-3, except that the air for entry into the lower end of tube 28 to displace the liquid in tank 23 is supplied to housing 30 through the vertical air tube 35. Also, the solution is able to flow out of housing 30 only through tube 36 which distributes it from its apertures 37 in substantially equal quantities to the various portions of the box. Tube 36 is particularly desirable when floor 11 is offset from horizontal to a considerable extent because in this situation the aggregate at the high areas of the floor and at the areas remote from housing 30 might not otherwise receive sufficient solution. It is noted again that the liquid level in the box may be adjusted by moving tube 28 up or down in order to vary the elevation of its lower end, and that this is accomplished without disturbing the garden bed. Manifestly, tube 35 is considerably less in length than the aeration tube 32, and the amount of tubing required may be reduced by using tube 35 in situations where aeration of the aggregate below its surface is not needed. The distribution tube 36 may be used in the embodiment shown in FIGS. 1-3, and it may be eliminated in the embodiment of FIG. 4 if desired.

Turning now to FIG. 5, a further embodiment of the invention is illustrated which is similar to those previously described for the most part. The significant change in the embodiment shown in FIG. 5 is the replacement of housing 30 and the associated components by an integral, L-shaped tube 38 within which the lower end of tube 28 is located. The preferred downward slope of the upper part of tube 28 as it extends away from tank 23 is particularly evident in FIG. 5.

The upper portion of tube 38 is oriented vertically and is sleeved around the vertical portion of tube 28, being larger in diameter than same. The top end of tube 38 is open and is located above the level of the aggregate contained in box 10 in order to supply air to the lower end of tube 28, which is located within the lower part of the vertical portion of tube 38.

The lower portion of tube 38 is integral with the upper portion and extends horizontally therefrom along the floor 11 of the garden box. With relatively small garden beds, it is contemplated that the remote end (not shown) of the horizontal portion of tube 38 will be open in order to discharge the solution to the aggregate. To prevent clogging of the open end of tube 38, it may be desirable to cover it with small stones when setting up the garden.

As an alternative to providing tube 38 with an open end, the horizontal portion of the tube may instead be provided with a series of spaced discharge outlets 39 which deliver the solution to the garden. Outlets 39 distribute the solution relatively uniformly throughout the garden and are therefore preferred in the case of relatively large garden beds in which a single oulet may not effectively distribute the solution to all areas of the bed.

The embodiment shown in FIG. 5 operates substantially like those discussed above, except that the air is supplied to the lower end of tube 28 via the open top end of tube 38. The liquid flows from tube 38 into the garden bed through the discharge outlets 39 (or through the open end of tube 38 if outlets 39 are not provided).

A liquid pool is maintained in box 10 at the level of the lower end of tube 28 in the same manner described previously. The level of the liquid pool may be adjusted by simply raising or lowering tube 28 within tube 38 without disturbing the garden. The embodiment of FIG. 5 is relatively simple and economical to construct and for this reason is particularly desirable for many types and sizes of gardens.

FIG. 6 illustrates yet another embodiment of the invention in which the open lower end of tube 28 is embedded in the aggregate 16 rather than being located within a hollow member such as housing 30 (FIGS. 1-4) or tube 38 (FIG. 5). In the FIG. 6 embodiment, the air in the aggregate itself enters the lower end of tube 28 so that the solution continues to flow through the tube from tank 23 until it reaches a depth to submerge the lower end of tube 28. Access to tube 28 is then denied, and air cannot displace the liquid within tank 23, so that the liquid flow stops until the depth of the liquid pool falls below the lower end of tube 28. In the embodiment shown in FIG. 6, the number of parts required is minimized and the construction is simple, although there are disadvantages as to the ease of adjustment of the liquid level and possible clogging of the liquid tube.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having this described the invention, I claim:

1. Apparatus for supplying liquid to a plant container that contains material in which plants are grown, said apparatus comprising:
   a substantially airtight tank for containing the liquid;
   a substantially hollow member removably disposed in the material in the plant container and covered by the material, said hollow member presenting an air chamber interiorly thereof;
   a liquid supply tube having an upper end communicating with said tank to receive liquid therefrom and a lower end disposed within said hollow member to supply liquid thereto, said liquid supply tube being arranged to receive air in the lower end thereof for passage to said tank to provide the sole access for air to enter the tank to displace the liquid therein;
   at least one outlet in said hollow member for discharging liquid therefrom; and
   an air inlet to said air chamber located at a level above the lower end of said liquid supply conduit to provide air which continually fills said chamber above the water level in said hollow member,
   whereby liquid from said tank flows through said supply tube and hollow member to the plant container whenever the lower end of said supply tube is above the level of the liquid in the plant container with air passing through said tube to the tank to displace the water which flows out of the tank.

2. Apparatus as set forth in claim 1, wherein said hollow member comprises a generally enclosed housing substantially completely enclosing said air chamber therewithin.

3. Apparatus as set forth in claim 1, including an elongate liquid distribution conduit connected with the outlet of said hollow member and arranged with a plurality of twists to extend throughout substantially the entirety of the plant container in proximity to the bottom thereof, said distribution conduit having a plurality of discharge openings spaced along the length thereof for discharging liquid to the plant container.

4. Apparatus as set forth in claim 1, including an elongate aeration conduit connecting with said air inlet and disposed entirely at a height above the lower end of said liquid supply tube, said aeration conduit presenting a plurality of apertures along its length for drawing in air due to a vacuum effect occurring whenever air within said chamber flows through said supply tube into the tank.

5. Apparatus as set forth in claim 3, wherein said aeration conduit is arranged with a plurality of twists to extend throughout substantially the entire area of the plant container.

6. Apparatus as set forth in claim 1, including a generally vertical air conduit extending into the material in the container and having a lower end communicating with said air chamber to provide said air inlet and an open upper end projecting upwardly out of the material in the plant container to receive air for passage into said chamber.

7. Apparatus as set forth in claim 6, wherein said air conduit is sleeved around a portion of said liquid supply tube to provide air access to said air chamber between said air conduit and lquid supply tube, the lower end of said air conduit being located above the lower end of said liquid supply tube and above the water level in the plant container, said liquid supply tube being axially movable in said air conduit to adjust the elevation of said liquid supply tube lower end and thereby adjust the level of the liquid in the plant container.

8. Apparatus as set forth in claim 1, including:
   a drain conduit communicating with the interior of the plant container at a level below the lower end of said liquid supply conduit; and
   a catch member supported on the plant container and operable to hold said drain conduit in an inclined orientation with the upper end of said drain conduit elevated only slightly above the lower end of said liquid supply conduit.

9. Apparatus as set forth in claim 8, wherein said drain conduit is transparent, and including means for positioning said drain conduit in a generally vertical orientation wherein the level to which the liquid rises in said drain conduit visually indicates the liquid level in the plant container.

10. Apparatus as set forth in claim 1, wherein said hollow member comprises a tube having a substantially vertical upper portion sleeved around said liquid supply tube and greater in diameter than same, said upper portion being open at the top and projecting above the soil in the plant container to provide said air inlet.

11. Apparatus as set forth in claim 10, wherein said tube is bent in a manner to present a lower portion integral with and extending generally horizontally from said upper portion, said liquid discharge outlet being formed in the lower portion of said tube.

* * * * *